United States Patent
Haneda et al.

(10) Patent No.: US 7,774,513 B2
(45) Date of Patent: Aug. 10, 2010

(54) DMA CIRCUIT AND COMPUTER SYSTEM

(75) Inventors: Terumasa Haneda, Kawasaki (JP); Yuichi Ogawa, Kawasaki (JP); Toshiyuki Yoshida, Kawasaki (JP); Yuji Hanaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 306 days.

(21) Appl. No.: 11/220,617

(22) Filed: Sep. 8, 2005

(65) Prior Publication Data

US 2006/0218313 A1 Sep. 28, 2006

(30) Foreign Application Priority Data

Mar. 25, 2005 (JP) .............................. 2005-089641

(51) Int. Cl.
*G06F 13/28* (2006.01)
*G06F 15/167* (2006.01)

(52) U.S. Cl. .............................. 710/22; 710/23; 710/28; 709/212

(58) Field of Classification Search ................. 710/22
See application file for complete search history.

(56) References Cited

U.S. PATENT DOCUMENTS

| | | | | |
|---|---|---|---|---|
| 5,768,530 A | * | 6/1998 | Sandorfi | 709/233 |
| 6,154,793 A | * | 11/2000 | MacKenna et al. | 710/23 |
| 6,188,699 B1 | * | 2/2001 | Lang et al. | 370/463 |
| 6,687,796 B1 | * | 2/2004 | Laine et al. | 711/149 |
| 7,155,541 B2 | * | 12/2006 | Ganapathy et al. | 710/24 |
| 7,185,151 B2 | * | 2/2007 | Michiie et al. | 711/154 |
| 7,415,550 B2 | | 8/2008 | Tanaka et al. | |
| 7,640,374 B2 | * | 12/2009 | Tomozaki et al. | 710/22 |
| 2005/0027901 A1 | * | 2/2005 | Simon et al. | 710/22 |
| 2005/0081016 A1 | * | 4/2005 | Sakai et al. | 712/1 |

FOREIGN PATENT DOCUMENTS

JP 07-028744 1/1995
WO 2004/079583 A1 9/2004

OTHER PUBLICATIONS

Japanese Office Action dated Jun. 30, 2009 and issued in corresponding Japanese Patent Application 2005-089641.

* cited by examiner

*Primary Examiner*—Henry W. H. Tsai
*Assistant Examiner*—Michael Sun
(74) *Attorney, Agent, or Firm*—Staas & Halsey LLP

(57) ABSTRACT

A DMA circuit operates a plurality of DMA channels in parallel, enabling reduction of the circuit scale and fewer development processes. A channel manager circuit reads in sequence the control information for each DMA channel from control memory, performs analysis, and according to the divided DMA control sequence, performs state processing (DMA control). Further, the channel manager circuit updates the control information, writes back the control information to the control memory, and executes time-division control of the plurality of DMA channels. Hence the circuit scale can be reduced, contributing to decreased costs, and the number of development processes can be reduced.

19 Claims, 11 Drawing Sheets

FIG. 2

| ADDRESS | DATA | | | | | |
|---|---|---|---|---|---|---|
| | CHST | DSC_NUM | DADR | SADR | BSZ | TADR |
| Ch.0 | | | | | | |
| Ch.1 | SAME AS Ch.0 | | | | | |
| Ch.2 | SAME AS Ch.0 | | | | | |
| ... | | | | | | |
| Ch.n | SAME AS Ch.0 | | | | | |

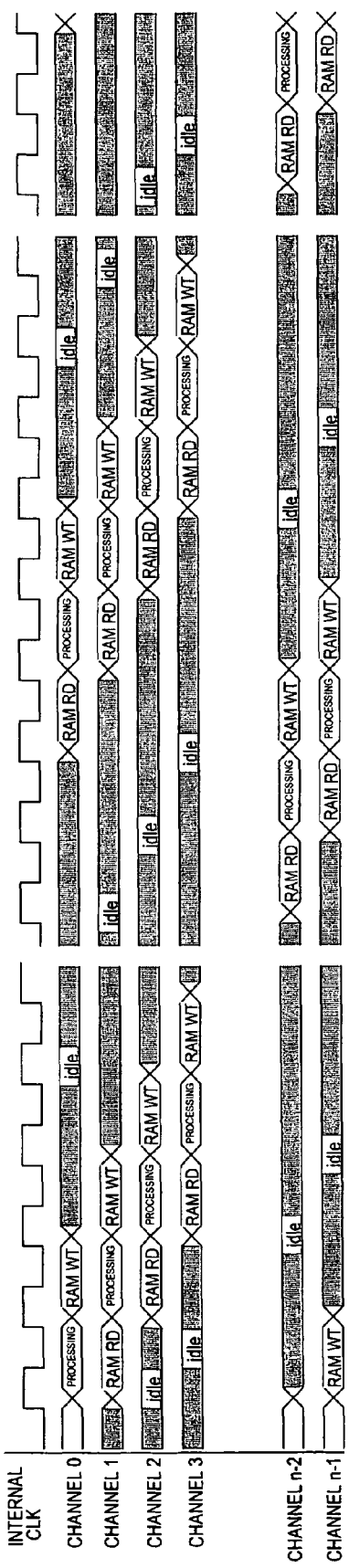

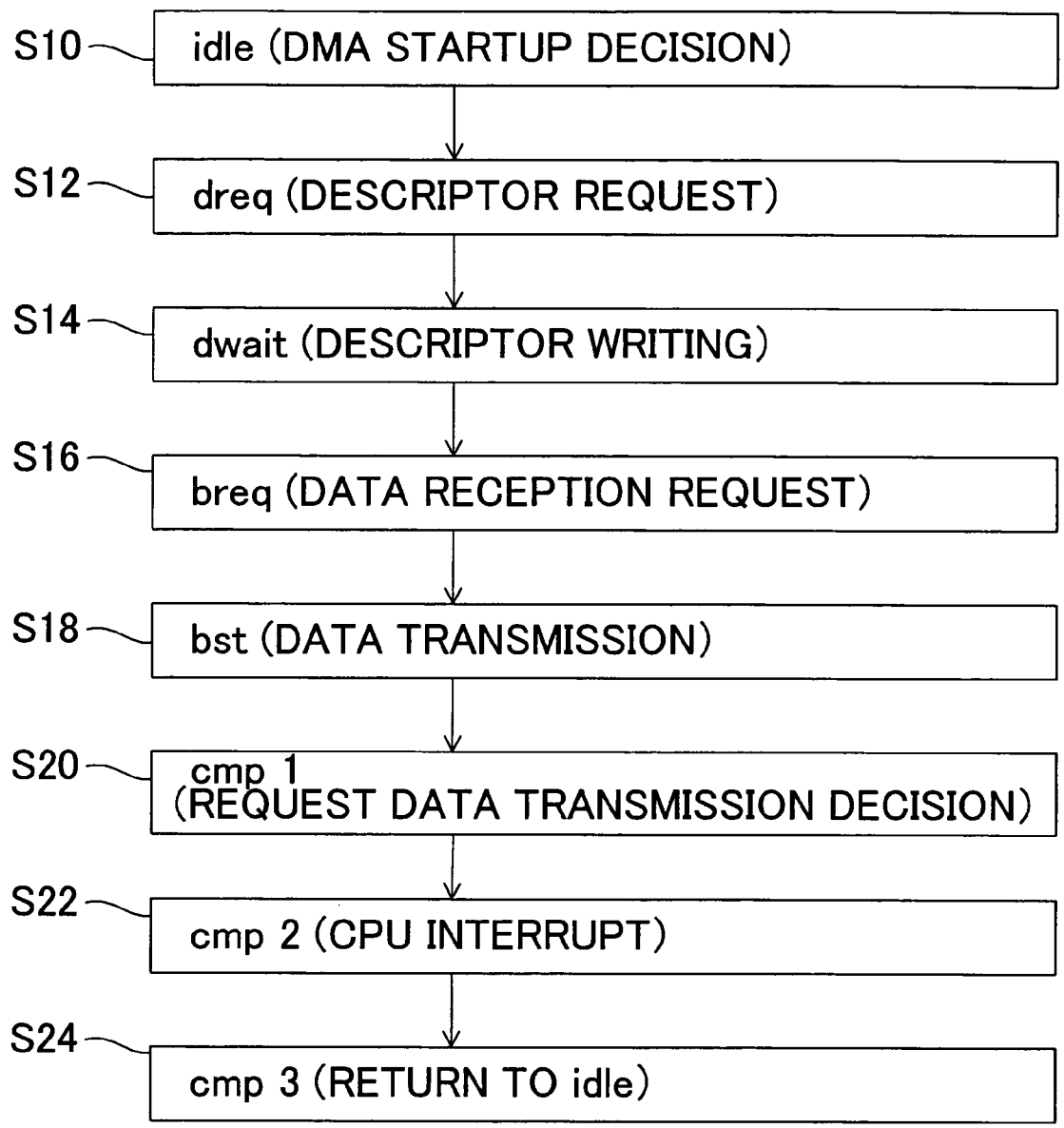

FIG. 7

| CHST(※) | DESCRIPTION OF PROCESSING |
|---|---|
| idle | ■WHEN DSC_NUM IS 0...<br>- DO NOTHING<br>■WHEN DSC_NUM IS OTHER THAN 0...<br>- OVERWRITE CHST TO dreq |
| dreq | ■WHEN "BUSY SIGNAL ★3" IS ASSERTED FROM DATA RECEPTION CONTROL BLOCK (4)<br>- DO NOTHING<br>■WHEN "BUSY SIGNAL ★3" IS NOT ASSERTED FROM DATA RECEPTION CONTROL BLOCK (4) ("IDLE" STATE)<br>- ISSUE DATA RECEPTION REQUEST ★6 TO DATA RECEPTION CONTROL BLOCK (4)<br>- NOTIFY DATA RECEPTION BLOCK (4) OF RECEIVED DATA (DESCRIPTOR) ADDRESS (=DADR) ★6<br>- OVERWRITE CHST TO dwait |
| dwait | ■WHEN CHANNEL MANAGER (5) INTERNAL SIGNAL 2<data_v> = "0"<br>- DO NOTHING<br>■WHEN CHANNEL MANAGER (5) INTERNAL SIGNAL 2<data_v> = "1"<br>- WRITE RECEIVED DATA(DISCRIPTOR=SADR/DSZ/TADR) ★8 FROM DATA RECEPTION CONTROL BLOCK[4] TO CHANNEL CONTROL RAM (8)<br>- OVERWRITE CHST TO breq |
| breq | ■WHEN "BUSY SIGNAL ★3" IS ASSERTED FROM DATA RECEPTION CONTROL BLOCK (4)<br>- DO NOTHING<br>■WHEN "BUSY SIGNAL ★3" IS NOT ASSERTED FROM DATA RECEPTION CONTROL BLOCK (4) ("IDLE" STATE)<br>- ISSUE DATA RECEPTION REQUEST ★6 TO DATA RECEPTION CONTROL BLOCK (4)<br>- NOTIFY DATA RECEPTION CONTROL BLOCK (4) OF RECEIVED DATA ADDRESS (=SADR) ★6<br>- OVERWRITE CHST TO bst |
| bst | ■WHEN CHANNEL MANAGER (5) INTERNAL SIGNAL 2<data_v>="0" AND .3<end_f>="0"<br>- DO NOTHING<br>■WHEN CHANNEL MANAGER (5) INTERNAL SIGNAL 2<data_v>="1" AND .3<end_f>="0"<br>- NOTIFY PACKET GENERATION BLOCK OF TRANSMISSION DATA ADDRESS (=TADR)<br>■WHEN CHANNEL MANAGER (5) INTERNAL SIGNAL 2<data_v>="0" AND .3<end_f>="1"<br>- DECREMENT BSZ BY 1 AND INCREMENT SADR/TADR BY 1<br>- OVERWRITE CHST TO cmp1 |
| cmp1 | ■WHEN BSZ IS 0...<br>- OVERWRITE CHST TO cmp2<br>■WHEN BSZ IS OTHER THAN 0...<br>- OVERWRITE CHST TO breq |
| cmp2 | - ISSUE INTERRUPT ★14 (INTERRUPT(n) n: CHANNEL NUMBER) TO CPU INTERFACE CONTROL BLOCK (1b)<br>- OVERWRITE CHST TO cmp3 |
| cmp3 | ※SOFTWARE DISCRIMINATES THE CHANNEL NUMBER FROM THE INTERRUPT NUMBER (n) UPON<br>RECEIVING AN INTERRUPT SIGNAL ★14, AND OVERWRITES THE Ch.(n) AREA CHST TO idle |

US 7,774,513 B2

DMA CIRCUIT AND COMPUTER SYSTEM

CROSS-REFERENCE TO RELATED APPLICATIONS

This application is based upon and claims the benefit of priority from the prior Japanese Patent Application No. 2005-089641, filed on Mar. 25, 2005, the entire contents of which are incorporated herein by reference.

BACKGROUND OF THE INVENTION

1. Field of the Invention

This invention relates to a DMA (Direct Memory Access) circuit and computer system which directly access and transfer memory data, and in particular relates to a DMA circuit and computer system which perform DMA transfer over many channels.

2. Description of the Related Art

In order to improve the speed of data processing in computer systems, DMA (Direct Memory Access) transfer is utilized for data transfer between CPUs. In DMA transfer, a DMA circuit receiving an instruction from a CPU directly accesses memory, reads data, and transfers the data to another CPU. In recent years, with the growing complexity of computer systems, the need has arisen for DMA transfer between numerous CPUs.

In such a computer system, there is a need for a single CPU to simultaneously perform DMA transfer to a plurality of CPUs. In this case, by implementing numerous DMA channels in the DMA circuitry, DMA transfer control can be executed in parallel in response to a DMA transfer instruction by a CPU, so that the load on CPUs can be alleviated.

FIG. 11 shows the configuration of a conventional DMA circuit in which are implemented n DMA channels (where n is greater than one). As shown in FIG. 11, the DMA transmission module has an MPU 100, memory 110, and DMA transmission circuit 120. The DMA transmission circuit 120 has a data reception arbiter 130 to receive data from the memory 110, a data buffer 140 to buffer data for transfer, a data transmission arbiter 150 for sending data to a switch module 200, and n DMA transmission channel circuits 160-1 to 160-n.

The MPU 100 writes transmission data to the memory 110, and then issues a transmission instruction to an arbitrary DMA transmission channel (for example, 160-1). The DMA transmission channel 160-1 issues a data receive request (REQ) to the data reception arbiter 130, and acquires the data from memory 110. The data from memory 110 is stored in the data buffer 140.

Next, upon receiving notification of completion (storage in the buffer 140 completed) from the data reception arbiter 130, the DMA transmission channel 160-1 issues a transmission request (REQ) to the data transmission arbiter 150. By this means, transmission data in the data buffer 140 is sent to the data bus (here, a switch module 200) from the data transmission arbiter 150. The DMA transmission channel 160-1 waits for a completion (CMP) response from the data transmission arbiter 150, and upon completion of data transmission, issues a completion notification to the MPU 100 (see for example Japanese Patent Laid-open No. 7-028477).

In order for the MPU 100 to start this series of actions on a plurality of channels, it has been necessary to implement n data transmission channels, 160-1 to 160-n, within the DMA transmission circuitry (LSI) 120.

Thus by providing a plurality of DMA channels in the DMA circuitry, the CPU (MPU) can start a plurality of DMA channels to perform a plurality of DMA transfers, and can execute parallel DMA control.

However, in conventional DMA circuitry it is necessary to implement a plurality of DMA transmission channel circuits, resulting in an increase in the number of gates (circuit scale) of the LSI (DMA transmission circuit). For example, in the configuration example of FIG. 11, because the switch module 200 is provided with eight ports, it is necessary to implement a maximum of seven DMA channel circuits. Hence there is the problem that the package must be increased according to the number of gates, incurring increased LSI unit costs and development costs.

SUMMARY OF THE INVENTION

Hence an object of the invention is to provide a DMA circuit and computer system to realize DMA functions in a plurality of channels through a small-scale circuit.

A further object of the invention is to provide a DMA circuit and computer system with a smaller-size DMA circuit LSI package, for reduced costs.

Still a further object of the invention is to provide a DMA circuit and computer system to reduce the number of processes to develop a circuit having DMA functions for a plurality of channels.

In order to achieve these objects, a DMA circuit of this invention has control memory, which stores, for a plurality of DMA channels, control information comprising the status of processing resulting from division of a series of DMA transfer processing; a buffer memory, which stores transfer data read from a memory; and a channel manager circuit, which performs time division in DMA channel units of DMA transfer processing to read transfer data to the buffer memory and to transfer, to the transfer destination, transfer data from the buffer memory. The channel manager circuit reads the control information from the control memory, analyzes the processing status of the read-out control information, executes a portion of the series of DMA transfer processing, updates the processing status of the control information to status indicating processing of the next portion following the executed portion of DMA transfer processing, and writes the result to the control memory.

Further, a computer system of this invention has a memory which stores transfer data, a DMA circuit which directly accesses the memory and has a plurality of DMA channels for data transfer, and a CPU which issues transfer instructions to the DMA circuit. And the DMA circuit has a control memory, which stores, for a plurality of DMA channels, control information comprising the status of processing resulting from division of a series of DMA transfer processing; a buffer memory, which stores transfer data read from the memory; and a channel manager circuit, which performs time division in DMA channel units of DMA transfer processing to read transfer data to the buffer memory and to transfer, to the transfer destination, transfer data from the buffer memory. The channel manager circuit reads the control information from the control memory, analyzes the processing status of the read-out control information, executes a portion of the series of DMA transfer processing, updates the processing status of the control information to status indicating processing of the next portion following the executed portion of DMA transfer processing, and writes the result to control memory.

In this invention, it is preferable that the channel manager circuit execute, in sequence and according to the processing status of the control information, the series of DMA transfer processing which comprises processing for judgment of a transfer instruction from an external device; processing to read a descriptor from memory; processing to read transfer data in memory according to the descriptor; and processing to transfer the read-out transfer data to the specified transfer destination.

In this invention, it is preferable that the control memory stores, in DMA channel units, control information having the processing status, control information read from the descriptor in the memory, and the transfer data readout control information.

In this invention, it is preferable that the channel manager circuit judge whether the readout control information of the descriptor in the control memory has been written from an external device, and begin DMA transfer processing for the written DMA channel.

In this invention, it is preferable that the channel manager circuit update the processing status to the readout processing status of the descriptor indicating starting of the DMA transfer processing.

In this invention, it is preferable that the channel manager circuit perform analysis to determine whether the processing status of the control memory is the readout processing status of the descriptor, and execute descriptor readout processing according to the descriptor readout control information in the memory written from an external device.

In this invention, it is preferable that the channel manager circuit, by executing the descriptor readout processing, write the read-out descriptor to the transfer data readout control information of the control information, and update the processing status to transfer data readout processing status.

In this invention, it is preferable that the channel manager circuit perform analysis to determine whether the control memory processing status is the transfer data readout processing status, and to execute transfer data readout processing from the memory using the transfer data readout control information.

In this invention, it is preferable that the channel manager circuit update the processing status to readout monitoring status of the buffer memory for the transfer data, through execution of transfer data readout processing.

In this invention, it is preferable that the channel manager circuit perform analysis to determine whether the processing status of the control memory is the monitoring status, and monitors whether readout of the transfer data to the buffer memory from the memory has started.

In this invention, it is preferable that the channel manager circuit use the monitoring to detect whether readout of the transfer data to buffer memory has started, and issue an instruction to start the transfer.

In this invention, it is preferable that the channel manager circuit use the monitoring to detect whether the readout of transfer data to buffer memory has been completed, and notify the external device of transfer completion.

In this invention, the channel manager circuit reads in sequence the control information for each DMA channel in the control memory, performs analysis, performs state processing (DMA control) according to the divided DMA control sequence, updates the control information, and write back the results to the control memory. By this means, time-division control of a plurality of DMA channels is executed, so that the circuit scale can be reduced, contributing to decrease costs, and the number of development processes can be decreased.

BRIEF DESCRIPTION OF THE DRAWINGS

FIG. 2 explains the control information for each DMA channel in FIG. 1;

FIG. 5 is a time chart of time-division operation in the DMA control of FIG. 1;

FIG. 6 shows the flow of sequence processing for DMA control in one embodiment of the invention;

FIG. 7 explains the sequence processing in FIG. 6;

DESCRIPTION OF THE PREFERRED EMBODIMENTS

Below, embodiments of the invention are explained, in the order of a DMA circuit, DMA control, a computer system using a DMA circuit, and other embodiments.

DMA Circuit

Figure 1:
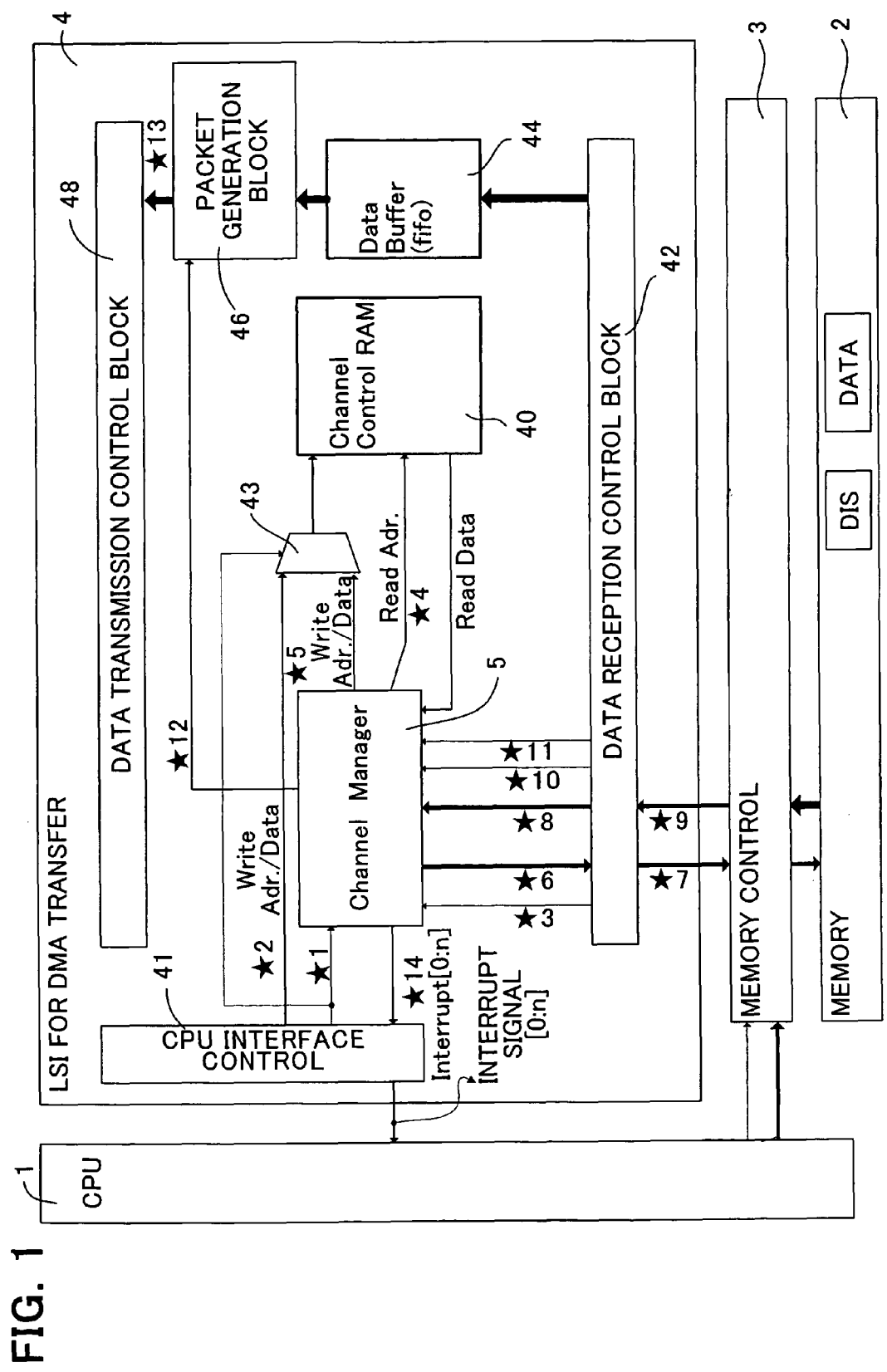
FIG. 1 shows the configuration of the DMA circuit of an embodiment of the invention.
Figure 3:
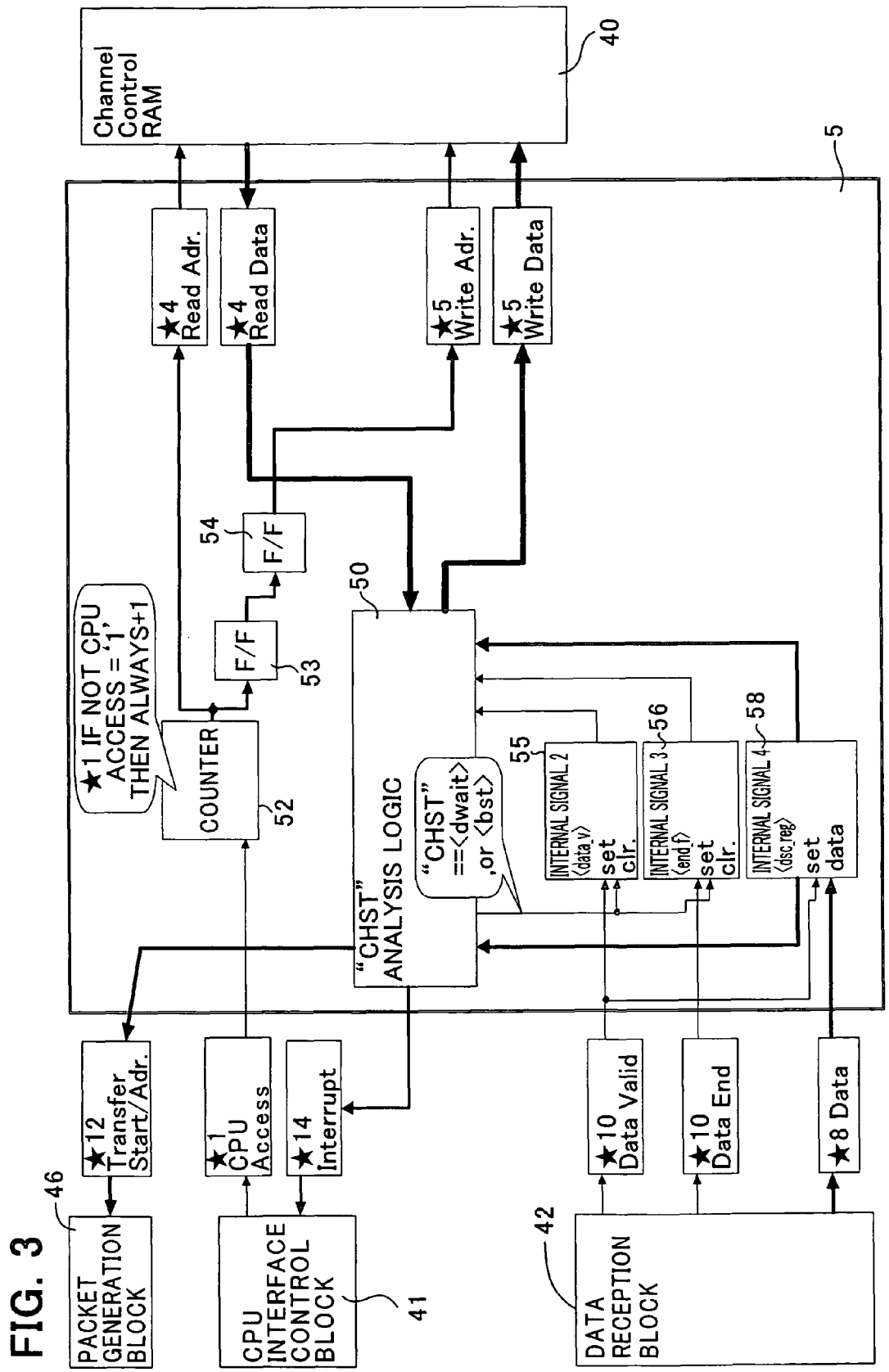
FIG. 3 shows the configuration of the channel manager circuit of FIG. 1.
Figure 4:
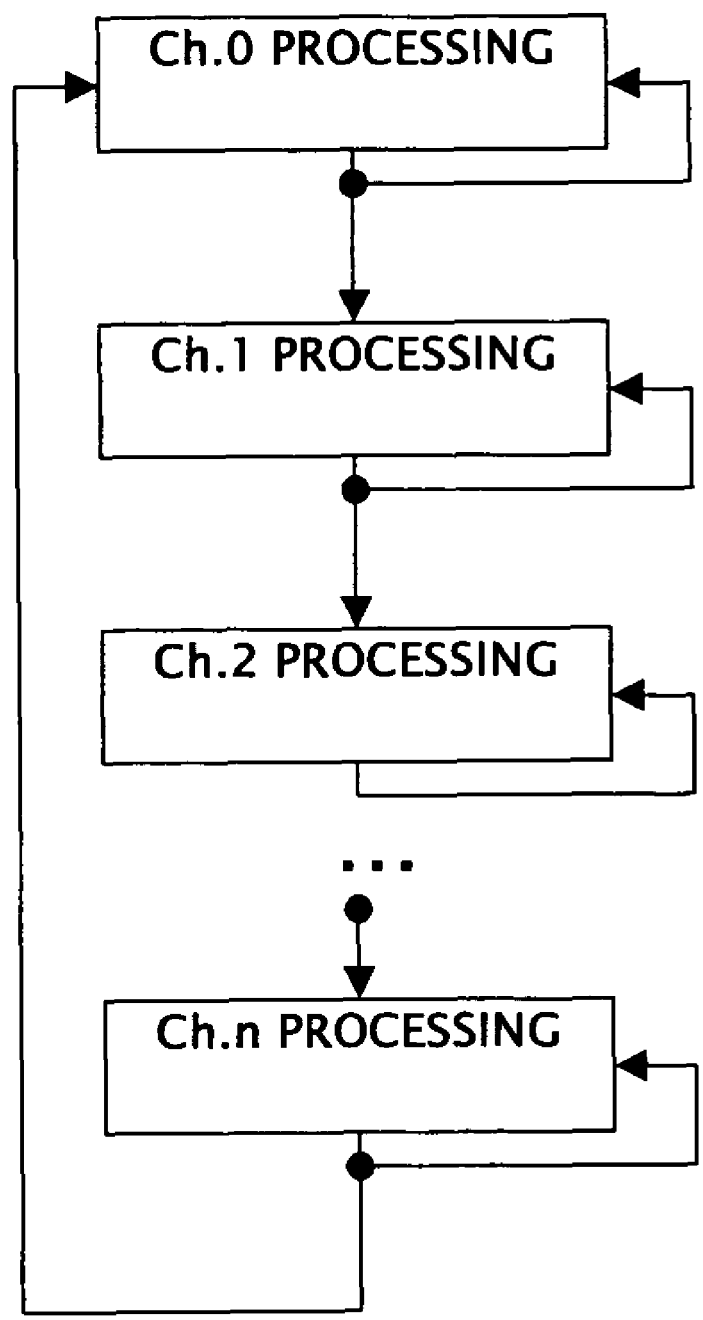
FIG. 4 explains time-division operation of DMA control in FIG. 1.

FIG. 1 shows the configuration of the DMA circuit of one embodiment of the invention, FIG. 2 explains the control information in FIG. 1, stored in RAM for each channel, FIG. 3 shows the configuration of the channel manager circuit of FIG. 1, and FIG. 4 and FIG. 5 explain the time-division control processing of the channel manager circuit.

As shown in FIG. 1, the DMA circuit (DMA transmission circuit) 4 is connected to a CPU 1 and to a memory controller 3 which is connected to memory (local memory of the CPU 1) 2. The CPU 1 writes the descriptor DIS for DMA transfer to the memory 2, via the memory controller 3.

The DMA circuit 4 has a CPU interface control portion 41 providing an interface with the CPU 1, a data reception control block 42, channel control RAM (Random Access Memory) 40, a data buffer 44, a packet generation block 46, a data transmission control block 48, a write gate 43, and a channel manager circuit 5.

The CPU interface control portion 41 executes write control to the channel control RAM 40 by means of the software of the CPU 1 and control of interrupts to the channel manager circuit 5. The data transmission control block 48 executes control of data transmission to an external bus. The data reception control block 42 issues a read request to the memory controller 3 upon startup by the channel manager circuit 5.

The channel manager circuit 5 virtually executes a plurality of DMA functions, as described below, employing the control information in the channel control RAM. The memory controller 3 executes control of access of the local memory of the CPU. The data buffer 44 is buffer memory for temporary storage of data read from the memory 2 by the data reception control block 42. The packet generation block 46 prepares the transmission data in a packet upon startup by the channel manager circuit 5.

The write gate 43 selects the write address/data *1 from the CPU 1 and the write address/data *5 from the channel manager circuit 5, and executes write access of the channel control RAM 40.

The channel control RAM 40 is internal RAM used to store control information for each of the DMA channels of the channel manager circuit 5. FIG. 2 explains the control information for DMA channels stored in RAM 40. As indicated in FIG. 2, the current status CHST, number of descriptors DSC_NUM expanded in the memory 2, address DADR of descriptors expanded in the memory 2, addresses SADR of data expanded in the memory 2, block size BSZ of data expanded in the memory 2, and transfer destination address TADR of data expanded in the memory 2, are stored for each of the DMA channels Ch.0 to Ch.n.

That is, the number of descriptors DSC_NUM and the descriptor address DADR are written by the CPU 1. The data address SADR, data block size BSZ, and data transfer destination address TADR are the contents of the descriptor read from the memory 2. Further, the status CHST is updated by the channel manager circuit 5 according to the sequence of DMA control explained in FIG. 6. The channel manager circuit 5 analyzes this status and executes DMA control.

FIG. 3 shows the configuration of the channel manager circuit 5. The channel manager circuit 5 has an address counter 52 which continually counts the number of clock pulses when there is no access by the CPU 1 and generates an address (read address); two flip-flop circuit stages 53 and 54, which delay the addresses from the address counter 52 by two clock intervals to generate write addresses; a first latch circuit 55, which latches the data valid signal (indicating data reception from the memory 2) from the data reception block 42; a second latch circuit 56, which latches the data end signal (indicating the end of storage of data from the memory 2 in the buffer 44) from the data reception block 42; and a register 58, which stores the descriptor read from the memory 2 via the data reception block 42.

The channel manager circuit 5 also has an analysis logic circuit 50 which is a state machine. The analysis logic circuit 50 analyzes read data (control information for the DMA channel indicated by the counter value) read out from RAM 40 at the read address of the address counter 52 according to the contents of the latch circuits 55, 56 and register 58, updates the processing status CHST of the control information, and writes the updated control information to the channel position (that is, the same DMA channel as for reading) indicating the write address in RAM 40.

That is, as shown in FIG. 4 and FIG. 5, the analysis logic circuit 50 reads the control information for channel Ch.0 from RAM 40 in the first clock interval, performs processing according to the control information in the second clock interval, and writes control information to RAM 40 in the third clock interval. In the second clock interval, control information for channel Ch.1 is read from RAM 40, and the analysis logic circuit 50 performs processing in the third clock interval according to this control information, and writes the control information for channel Ch.1 to RAM 40 in the fourth clock interval. Similar processing is performed for channels Ch.2, Ch.3, ..., Ch.n, and upon counting to n the counter 52 returns to "0", so that processing returns to channel Ch.0, as shown in FIG. 4.

Thus as shown in FIG. 4, the channel manager circuit 5 reads in sequence control information for each DMA channel (status CHST and similar) in channel control RAM 40, performs analysis, performs state processing (DMA control) according to the DMA control sequence explained in FIG. 6 below, updates the control information, and writes the control information back to RAM 40. By this means, time-division control of a plurality of DMA channels is executed.

DMA Control

Next, analysis of control information and DMA control by the channel manager circuit 5 (and in particular by the analysis logic circuit 50) are explained. FIG. 6 shows the flow of state processing for DMA control, and FIG. 7 explains the sequence processing in FIG. 6.

(S10) The analysis logic circuit 50 makes a decision to start DMA when the control information status CHST is "idle", that is, in the idle state. As in FIG. 7, in idle the number of control information descriptors DSC_NUM is '0'; that is, as explained in FIG. 2, when the CPU 1 has not written a number of descriptors, the DMA channel has not been started, so that the analysis logic circuit 50 does not perform any processing. If on the other hand the number of descriptors DSC_NUM in the control information is not '0', that is, if the CPU 1 writes a number of descriptors as explained in FIG. 2, then a decision is made to start DMA, and the analysis logic circuit 50 overwrites the status CHST of control information to "dreq" in step S12 and writes back the status to RAM 40.

(S12) With the control information status CHST at "dreq", that is, in the dreq state, the analysis logic circuit 50 issues a descriptor request. As shown in FIG. 7, in "dreq" a check is performed as to whether a busy signal *3 is asserted from the data reception block 42 (see FIG. 1). If a busy signal *3 is asserted, the data reception block 42 is currently accessing the memory 2 due to a request from another DMA channel, and so the analysis logic circuit 50 performs no processing. If on the other hand a busy signal *3 is not asserted, the data reception block 42 is idle, and so the analysis logic circuit 50 issues a data reception request *6 (see FIG. 1) to the data reception block 42, and then notifies the data reception block 42 of the descriptor address DADR written to the control information by the CPU 1, overwrites the control information status CHST to the "dwait" of step S14, and writes this back to RAM 40.

(S14) Next, with the control information status CHST at "dwait", that is, in the dwait state, the analysis logic circuit 50 performs descriptor writing. As in FIG. 7, in "dwait" a check is made, through the latch output of the first latch circuit 55, to determine whether a data valid signal data_v has been received from the data reception block 42. If a data valid signal data_v has not been received, the data reception block 42 has not received the requested descriptor from the memory 2, and so the analysis logic circuit 50 performs no processing. If however a data valid signal data_v has been received, the data reception block 42 has received the requested descriptor from the memory 2, and so the analysis logic circuit 50 receives the descriptor contents from the register 58 (see FIG. 3) and writes to the descriptor fields (SADR/DSZ/TADR) of control information, and moreover updates the status CHST of the control information to "breq" in step S16, and write back the control information to RAM 40.

(S16) With the status CHST of the control information at "breq", that is, in the breq state, the analysis logic circuit 50 requests transmission data. As in FIG. 7, in "breq" a check is made as to whether a busy signal *3 (see FIG. 1) is asserted by the data reception block 42. If a busy signal *3 is asserted, the data reception block 42 is currently accessing the memory 2 due to a request from another DMA channel, and so the analysis logic circuit 50 performs no processing. If on the other hand a busy signal *3 is not asserted, the data reception block 42 is in idle, and so the analysis logic circuit 50 issues a request for data reception *6 to the data reception block 42 (see FIG. 1), and then notifies the data reception block 42 of the transmission data address SADR in the control information descriptor, decrements the number of descriptors DSC_NUM in the control information by "1", increments the descriptor address DADR by "1", overwrites the status CHST to the "bst" of step S18, and writes back the control information to RAM 40.

(S18) Next, with the status CHST in the control information at "bst", that is, in the bst state, the analysis logic circuit 50 performs data transmission. As shown in FIG. 7, when the status is "bst" checks are made to determine whether a data valid signal data_v has been received from the data reception block 42 from the latch output of the first latch circuit 55 and whether a data end signal has been received from the latch output of the second latch circuit 56. If neither a data valid data_v nor a data end end_f signal has not been received (if both are "0"), then the data reception block 42 has not received the requested transmission data from the memory 2, and so the analysis logic circuit 50 performs no processing. If however a data valid signal data_v has been received (="1"), but a data end end_f has not been received (="0"), the data reception block 42 is storing the requested transmission data from the memory 2 in the buffer 44, and so the packet generation block 46 is notified in advance of the data transfer destination address TADR in the control information, and the control information is not overwritten. If the data valid signal data_v is cleared (="0"), but a data end end_f is received (="1"), then the data reception block 42 has completed storage in the buffer 44 of the requested transmission data from the memory 2, and so the control information data block size BSZ is decremented by 1, the status CHST is overwritten to the "cmp1" of step S20, and the control information is written back to RAM 40.

(S20) Next, with the status CHST of the control information at cmp1, that is, in the cmp1 state, the analysis logic circuit 50 decides whether the requested data has been transmitted. As shown in FIG. 7, when the data block size BSZ of the control information is "0", it is decided that the DMA transfer requested by the CPU 1 is ended, so that the status CHST of the control information is overwritten to "CMP2", and the information is written back to RAM 40. If on the other hand the data block size BSZ of the control information is not "0", then the requested data has not yet been transferred, and so the analysis logic circuit 50 overwrites the status CHST of the control information to the "dreq" of step S12, and writes back the information to RAM 40. As a result, processing returns to step S12.

(S22) Next, with the status CHST of the control information at cmp2, that is, in the cmp2 state, the analysis logic circuit 50 issues an interrupt (interrupt "n", channel number n) to the CPU interface control circuit 41, overwrites the status CHST of the control information to the "cmp3" of step S24, and writes back the control information to RAM 40.

(S24) Next, the software of the CPU 1, upon receiving notification *14 via the CPU interface control circuit 41, judges the channel number from the interrupt number, and overwrites the status CHST of the control information for channel "n" in channel control RAM 40 to "idle", via the CPU interface control circuit 41 and the write gate 43. As a result, processing returns to step S10.

Figure 8:
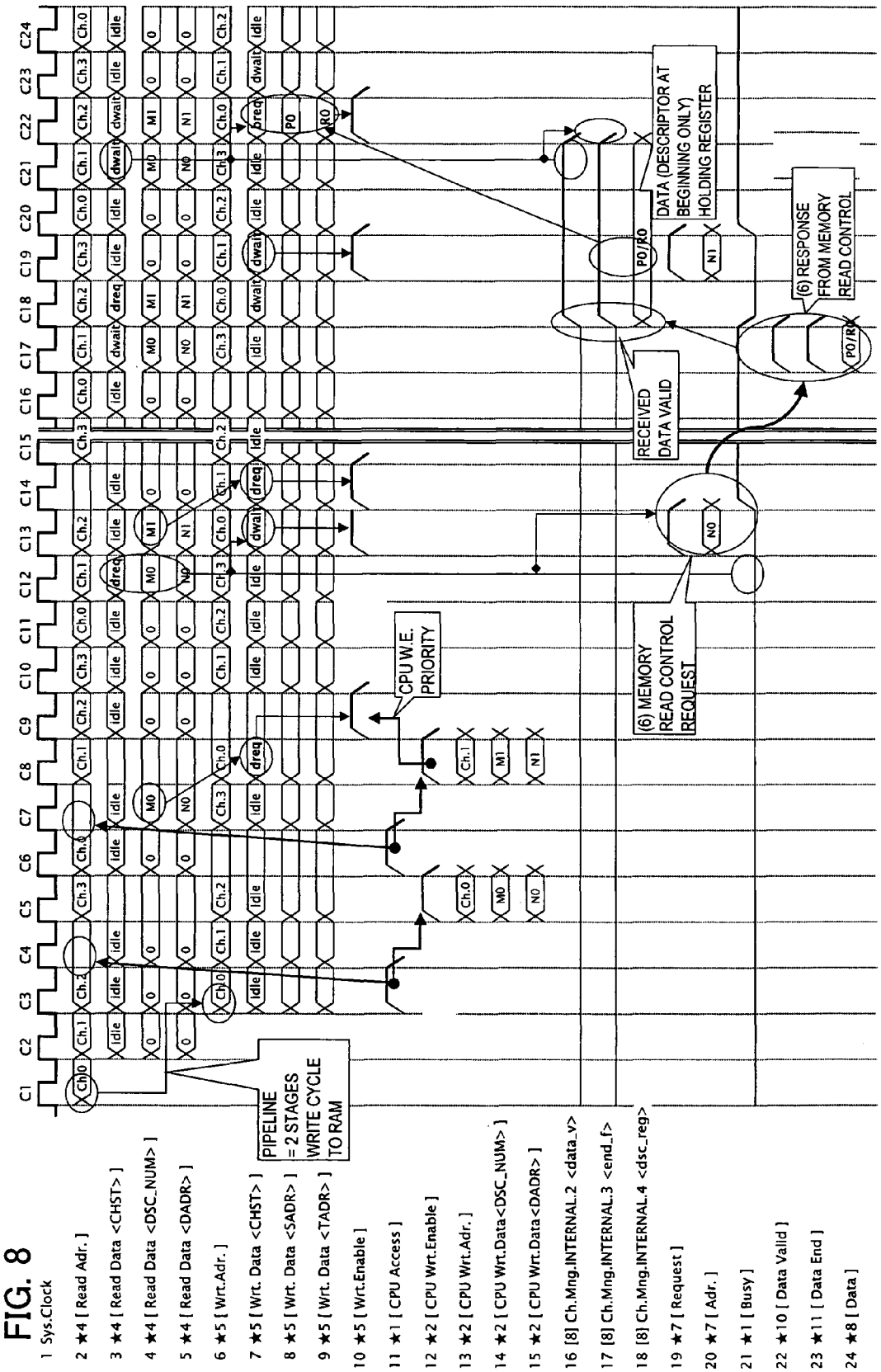
FIG. 8 is a time chart of descriptor fetch operation in the DMA control of one embodiment of the invention.
Figure 9:
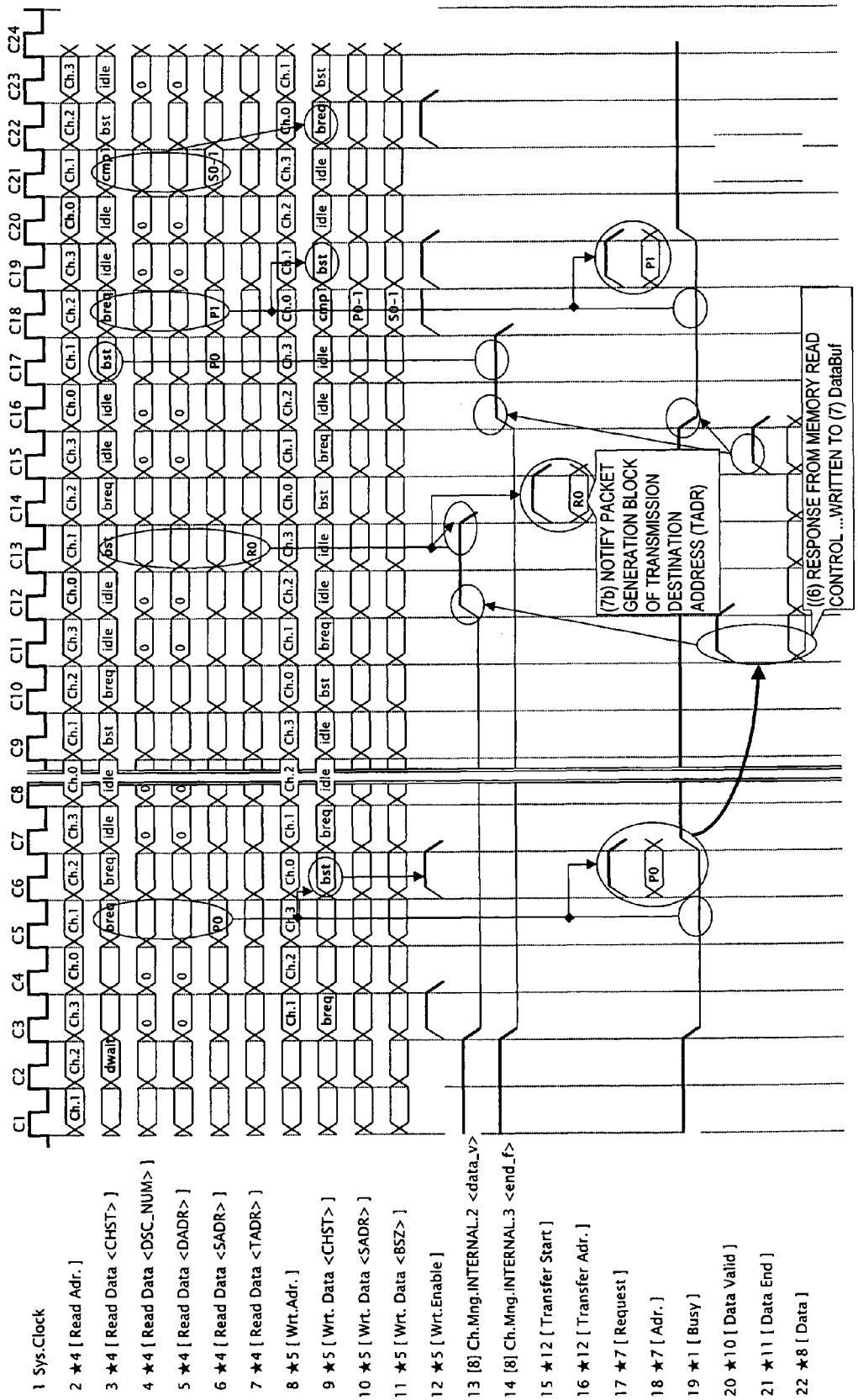
FIG. 9 is a time chart of transfer data fetch operation in the DMA control of one embodiment of the invention.

FIG. 8 and FIG. 9 are time charts with the processing of FIG. 6 and FIG. 7 appended to the time chart of FIG. 5. FIG. 8 shows the time chart up to the descriptor fetch, and FIG. 9 shows the data fetch time chart. In FIG. 8 and FIG. 9, in order to facilitate explanation, four DMA channels, Ch.0 to Ch.3, are assumed.

As shown in FIG. 8, the read address advances sequentially from Ch.0, and it is assumed that the status CHST is "idle". It is further supposed that at clock interval C3 the CPU 1 executes access, at clock interval C4 counting of the counter 52 is halted, and at clock interval C5 the CPU 1 writes the values "M0" and "N0" respective to the number of descriptors DSC_NUM and to the descriptor address DADR of the control information for Ch.0 in RAM 40.

Similarly, at clock interval C6 the CPU 1 executes access, at clock interval C7 counting of the counter 52 is halted, and at clock interval C8 the CPU 1 writes the values "M1" and "N1" respective to the number of descriptors DSC_NUM and to the descriptor address DADR of the control information for Ch.1 in RAM 40.

In this clock interval C7, in order to read the control information of clock interval C6 for Ch.0, the channel manager circuit 50 executes step S10 to perform the processing of clock interval C7, and in clock interval C8 the status CHST of the control information is to be overwritten to "dreq". However, because the CPU 1 is given priority, in clock interval C9 the channel manager circuit 50 is write-enabled, and in clock interval C9 the status CHST of the control information for Ch.0 in RAM 40 is overwritten to "dreq".

Focusing on the intervals for channel Ch.0, in the next cycle for Ch.0 processing, that is, clock interval C12, the memory read request (descriptor request "No") of step S12 is issued, and in clock interval C13 the status CHST for Ch.0 of RAM 40 is overwritten to "dwait". Similarly, the control information for Ch.1 is read in clock interval C12, so that the channel manager circuit 50 executes step S10 in the processing of clock interval C13, and in the clock interval C14 overwrites the control information status CHST to "dreq".

In clock interval C17, upon a response from the memory controller 3, the descriptor requested of the register 58 is held. The control information for Ch.0 is then read in clock interval C20 in the order of Ch.0, and the channel manager circuit 50 executes the dwait processing of step S14 in the processing of clock interval C21, and overwrites the status CHST to "breq" and overwrites the descriptor contents (SADR/TADR) of the control information in clock interval C22. By this means, descriptor fetching is performed.

Similarly in FIG. 9, focusing on the cycles for Ch.0, in the next Ch.0 processing cycle, that is, in clock interval C5, the memory read request of step S16 (transmission data fetch request "P0") is issued, and in clock interval C6 the status CHST for Ch.0 in RAM 40 is overwritten to "bst". In FIG. 9, to simplify the explanation, clock symbols are the same as the symbols in FIG. 8, but in actuality the clock numbers are continuous from the clock numbers of FIG. 8.

In clock interval C11, upon a response from the memory controller 3, the control information for Ch.0 is read in the Ch.0 sequence of clock interval C12, and the channel manager circuit 50 executes the bst processing of step S18 in the processing of clock interval C13, and in clock interval C14 notifies the packet generation block 46 of the transmission destination address TADR.

Further, in clock interval C15, upon an end response from the memory controller 3, the Ch.0 control information is read in the sequence of Ch.0 in clock interval C16, and the channel manager circuit 50 executes the bst processing of step S18 in the processing of clock interval C17. In clock interval C18 the control information status CHST is overwritten to "cmp1". In this manner, data fetching is performed.

Thus by means of a counter, the status CHST of control information is read for each channel from RAM in sequence, the status CHST is analyzed, and DMA state control is executed accordingly. Hence by merely adding RAM and providing the analysis logic circuit 50 with analysis functions, control of a plurality of DMA channels is made possible.

Computer System Using a DMA Circuit

Figure 10:
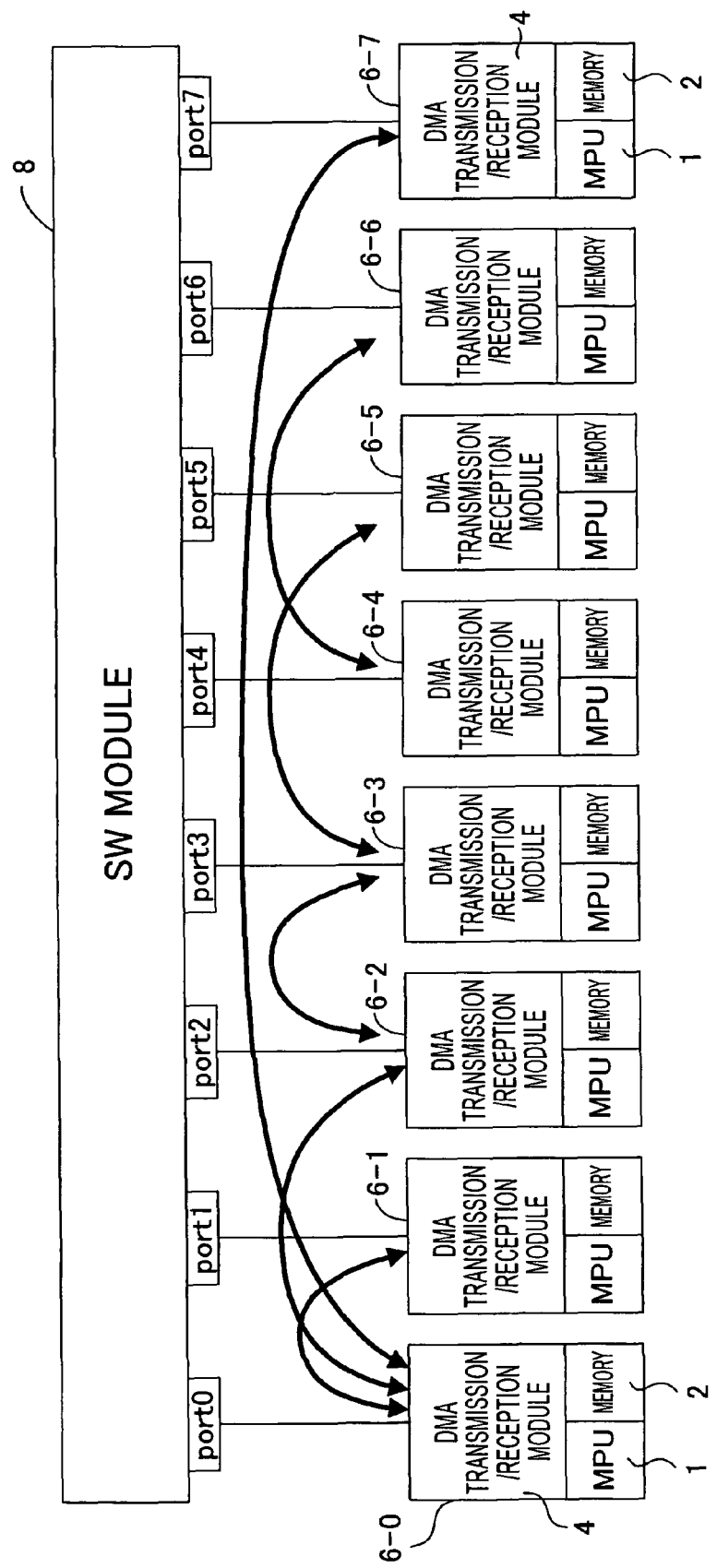
FIG. 10 shows the configuration of a computer system to which a DMA circuit of this invention is applied; and, FIG. 11 shows the configuration of a DMA circuit of the prior art, having a plurality of DMA channels.
Figure 11:
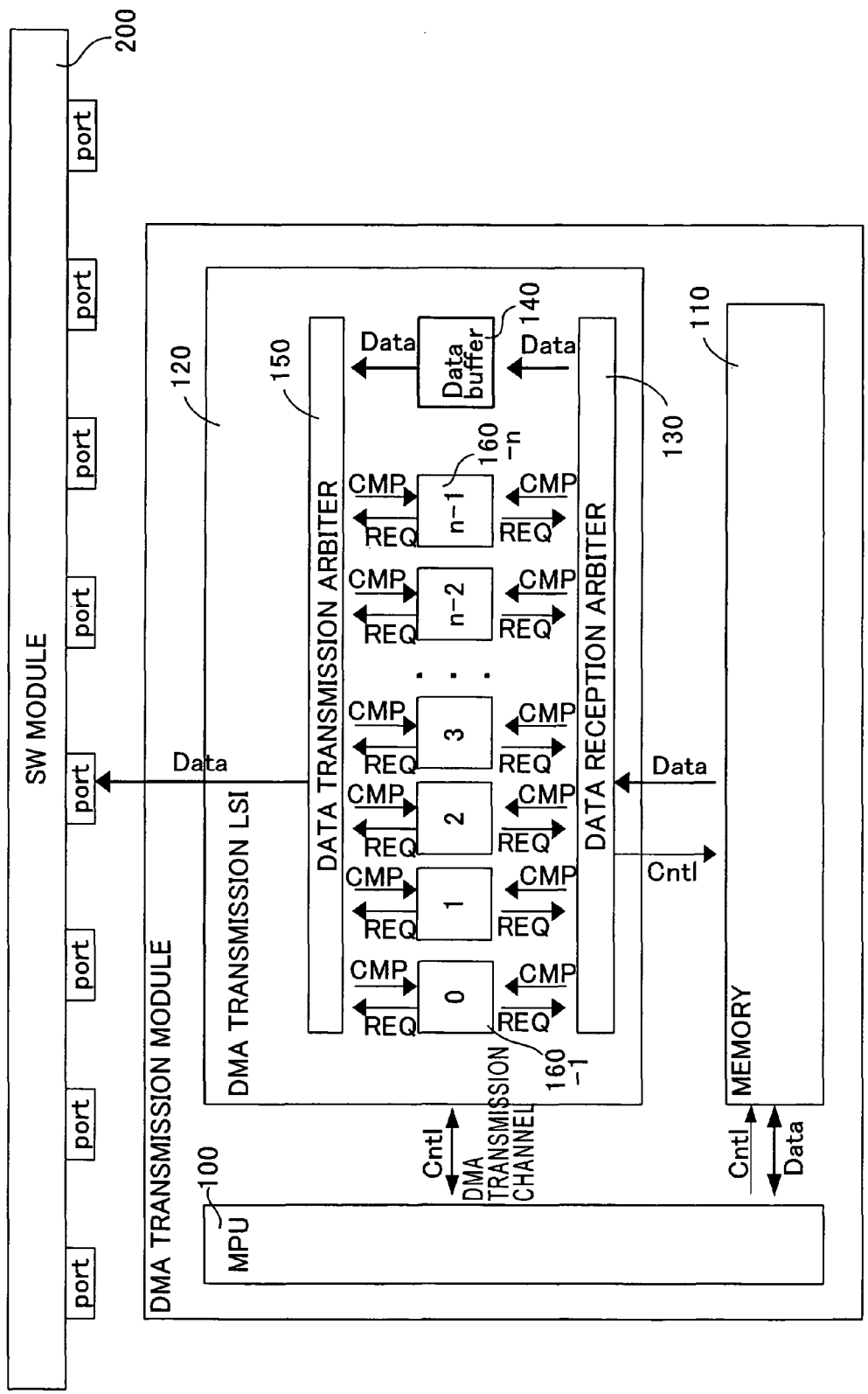

FIG. 10 shows the configuration of a computer system to which a DMA circuit of this invention is applied. As shown in FIG. 10, eight processing modules 6-0 to 6-7, comprising a CPU (MPU) 1, memory 2, and a DMA circuit 4, are provided, and eight nodes of a switch module 8 are connected to each of the processing modules 6-0 to 6-7.

In such a computer system, one processing module (for example, 6-0) performs DMA transfer with a plurality of other processing modules (for example, 6-1, 6-2, 6-7) via the switch module 8. In such a case, the DMA circuits 4 have a plurality of DMA channels, so that a CPU 1 can issue instructions to the DMA circuit 4 for DMA transfer to a plurality of processing modules, without waiting for DMA transfer with one processing module. Thus the load on the CPU 1 can be alleviated, and parallel DMA transfer control is performed, so that transfer processing times can be shortened.

Through use of the virtual parallel DMA functions of this invention, the circuit scale of each DMA circuit can be decreased, contributing to cost reductions and enabling a smaller number of development processes.

In particular, when the processing modules 6-0 to 6-7 comprise a storage control module which accesses numerous storage devices (for example, disk storage devices) upon instructions from a host, in the interest of data redundancy, data copying may be performed frequently between processing modules. Hence application to a storage system would be appropriate.

Other Embodiments

In the above-described embodiment, an example of packet transfer was explained, but application to burst transfer is also possible. Also, magnetic disk devices are suitable as the disk storage devices, but application to storage devices employing optical disks, magneto-optical disks, and other storage media is also possible. And, the number of DMA channels may be increased or decreased as necessary, but in essence it is sufficient that there be two or more.

In the above, embodiments of the invention have been explained, but various modifications are possible within the scope of the invention, and these modifications are not excluded from the scope of the invention.

Because a channel manager circuit reads out in sequence the control information for each DMA channel from control memory, performs analysis, performs state processing (DMA control) according to the sequence of divided DMA control, updates the control information, and writes back the control information to control memory, it is possible to execute time-division control of a plurality of DMA channels. So, the circuit scale can be reduced, the number of development processes can be decreased, and an inexpensive device can be provided quickly.

What is claimed is:

1. A DMA circuit, comprising:
   a buffer memory, which stores transfer data read from a memory;
   a channel manager circuit which executes a DMA transfer processing of a plurality of DMA channels each of which directly accesses said memory and transfers data in response to transfer instructions from an external device; and
   a control memory, which stores control information comprising a progress status of said DMA transfer processing of each of the plurality of DMA channels,
   wherein said channel manager circuit reads said control information of each of the plurality of DMA channels from said control memory in the order of the plurality of DMA channels, analyzes the read progress status in said control information, executes a divided processing of said DMA transfer processing in the corresponding DMA channel according to the analyzed progress status and as indicated by said control information, updates the progress status in said control information of said DMA channel to the status of the next processing following said executed divided processing of said DMA transfer processing, and writes back said control information to said control memory,
   said divided processing of said DMA transfer processing comprising a first processing to judge a transfer instruction from said external device, a second processing to read a descriptor from said memory after said first processing, a third processing to read transfer data from said memory according to said descriptor after said second processing, and a fourth processing to transfer said transfer data to specified said transfer destination after said third processing.

2. The DMA circuit according to claim 1, wherein said control memory stores control information of each DMA channels, having the progress status, read-out control information of said descriptor in said memory, and readout control information for said transfer data.

3. The DMA circuit according to claim 2, wherein said channel manager circuit judges whether read-out control information of said descriptor has been written in said control memory by said external device, and initiates said DMA transfer processing for said written DMA channel when judging said read-out control information of said descriptor has been written in said control memory.

4. The DMA circuit according to claim 3, wherein said channel manager circuit updates the progress status to a read-out progress status of said descriptor, indicating the initiation of said DMA transfer processing.

5. The DMA circuit according to claim 4, wherein said channel manager circuit analyzes that the progress status of said control memory is the status of readout processing of said descriptor, and based on the readout control information of the descriptor in said memory written by said external device, executes said second processing of said descriptor.

6. The DMA circuit according to claim 5, wherein said channel manager circuit, by executing said second processing of said descriptor, writes said descriptor to readout control information for said transfer data of said control information, and updates said processing status to readout processing status for said transfer data.

7. The DMA circuit according to claim 6, wherein said channel manager circuit analyzes that the progress status in said control memory is readout processing status for said transfer data, and executes said third processing of said transfer data from said memory by using said readout control information for said transfer data.

8. The DMA circuit according to claim 7, wherein said channel manager circuit updates the progress status to read-out monitoring status of said buffer memory for said transfer data by executing readout processing of said transfer data.

9. The DMA circuit according to claim 8, wherein said channel manager circuit analyzes that the progress status in said control memory is said monitoring status, and monitors the initiation of readout of said transfer data from said memory to said buffer memory.

10. The DMA circuit according to claim 9, wherein said channel manager circuit, through said monitoring, detects the initiation of readout of said transfer data to said buffer memory and issues an instruction to begin said transfer.

11. The DMA circuit according to claim 10, wherein said channel manager circuit, through said monitoring, detects the completion of readout of said transfer data to said buffer memory, and notifies said external device of the completion of said transfer.

12. A computer system, comprising:
a memory which stores transfer data;
a DMA circuit having a plurality of DMA channels which directly access said memory and transfer data; and
a CPU which issues transfer instructions to said DMA circuit, wherein said DMA circuit comprises:
a buffer memory, which stores transfer data read from said memory;
a channel manager circuit which executes a DMA transfer processing of a plurality of DMA channels, each of which directly accesses memory and transfers data in response to transfer instructions from an external device; and
a control memory, which stores control information comprising a progress status of said DMA transfer processing of each of the plurality of DMA channels,
wherein said channel manager circuit reads said control information of each of the plurality of DMA channels from said control memory in the order of the plurality of DMA channels, analyzes the read progress status in said control information, executes a divided processing of said DMA transfer processing in the corresponding DMA channel according to the analyzed progress status and as indicated by said control information, updates the progress status in said control information of said DMA channel to the status of the next processing following said executed divided processing of said DMA transfer processing, and writes back said control information to said control memory,
said divided processing of said DMA transfer processing comprising a first processing to judge a transfer instruction from said external device, a second processing to read a descriptor from said memory after said first processing, a third processing to read transfer data from said memory according to said descriptor after said second processing, and a fourth processing to transfer said transfer data to specified said transfer destination after said third processing.

13. The computer system according to claim 12, wherein said control memory stores control information of each DMA channels, having the progress status, read-out control information of said descriptor in said memory, and readout control information for said transfer data.

14. The computer system according to claim 13, wherein said channel manager circuit judges whether read-out control information of said descriptor has been written in said control memory by said CPU, and initiates said DMA transfer processing for said written DMA channel when judging said read-out control information of said descriptor has been written in said control memory.

15. The computer system according to claim 14, wherein said channel manager circuit updates the progress status to a readout progress status of said descriptor indicating the initiation of said DMA transfer processing.

16. The computer system according to claim 15, wherein said channel manager circuit analyzes that the progress status of said control memory is the status of readout processing of said descriptor, and based on the readout control information of the descriptor in said memory written by said CPU, executes said second processing of said descriptor.

17. The computer system according to claim 16, wherein said channel manager circuit, by executing said second processing of said descriptor, writes said descriptor to readout control information for said transfer data of said control information, and updates said processing status to readout processing status for said transfer data.

18. The computer system according to claim 17, wherein said channel manager circuit analyzes that the progress status in said control memory is said third processing status for said transfer data, and executes readout processing of said transfer data from said memory by using said readout control information for said transfer data.

19. A DMA circuit comprising:
a buffer memory, which stores transfer data read from a memory;
a channel manager circuit virtually executing a DMA transfer processing for the plurality of DMA channels by performing a divided processing of said DMA transfer processing of a single DMA request, in a time-division fashion, for said each of the plurality of DMA channels, said DMA transfer processing divided a plurality of processing from directly accessing of said memory until transferring of accessed said data in response to transfer instructions from an external device; and
a control memory, which stores control information comprising a progress status of said divided processing of said DMA transfer processing of single DMA transfer request, for each of the plurality of DMA channels,
wherein said channel manager circuit reads said control information of each of the plurality of DMA channels from said control memory in the order of the plurality of DMA channels, analyzes the progress status in said control information, executes said divided processing of said DMA transfer processing according to analyzed progress status and as indicated by said control information, updates the progress status in said control information of the corresponding DMA channel to the status of the next processing following said executed divided processing of said DMA transfer processing, and writes back said control information to said control memory,
said divided processing of said DMA transfer processing comprising a first processing to judge a transfer instruction from said external device, a second processing to read a descriptor from said memory after said first processing, a third processing to read transfer data from said memory according to said descriptor after said second processing, and a fourth processing to transfer said transfer data to specified said transfer destination after said third processing.

* * * * *